United States Patent
Hoisington

(10) Patent No.: US 11,674,271 B2
(45) Date of Patent: Jun. 13, 2023

(54) CONTROL SYSTEM FOR A PAVING MACHINE

(71) Applicant: Caterpillar Paving Products Inc., Brooklyn Park, MN (US)

(72) Inventor: Kent A. Hoisington, Mound, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 799 days.

(21) Appl. No.: 16/452,883

(22) Filed: Jun. 26, 2019

(65) Prior Publication Data

US 2020/0407925 A1 Dec. 31, 2020

(51) Int. Cl.
| | |
|---|---|
| *E01C 19/48* | (2006.01) |
| *E01C 19/00* | (2006.01) |
| *E01C 23/07* | (2006.01) |
| *G01B 21/08* | (2006.01) |
| *G01B 5/06* | (2006.01) |
| *E01C 19/42* | (2006.01) |

(52) U.S. Cl.
CPC ............ *E01C 19/006* (2013.01); *E01C 19/42* (2013.01); *E01C 19/48* (2013.01); *E01C 23/07* (2013.01); *G01B 5/06* (2013.01); *G01B 21/08* (2013.01)

(58) Field of Classification Search
CPC ........ E01C 19/006; E01C 19/42; E01C 19/48; E01C 23/07; G01B 5/06; G01B 21/08
USPC .................. 404/72, 75, 84.05–84.5, 118
See application file for complete search history.

(56) References Cited

U.S. PATENT DOCUMENTS

| | | | |
|---|---|---|---|
| 7,484,911 B2 | 2/2009 | Frelich | |
| 8,930,092 B2 | 1/2015 | Minich | |
| 9,004,811 B2 | 4/2015 | Mings et al. | |
| 9,505,567 B2 | 11/2016 | Swearingen | |
| 10,227,738 B2 | 3/2019 | Horn et al. | |
| 10,246,833 B2 | 4/2019 | Blank et al. | |
| 2012/0288328 A1* | 11/2012 | Minich | E01C 19/48 |
| | | | 404/72 |
| 2014/0136023 A1* | 5/2014 | Jaccoma | A01B 76/00 |
| | | | 701/2 |
| 2014/0186115 A1 | 7/2014 | Graham et al. | |
| 2016/0170415 A1* | 6/2016 | Zahr | G05D 1/0293 |
| | | | 701/23 |

(Continued)

FOREIGN PATENT DOCUMENTS

| | | |
|---|---|---|
| CN | 2743411 Y | 11/2005 |
| CN | 105178146 A | 12/2015 |

(Continued)

OTHER PUBLICATIONS

Search report for Chinese patent appln. No. 202010560748, dated Apr. 13, 2023, 3 pgs.

*Primary Examiner* — Raymond W Addie
(74) *Attorney, Agent, or Firm* — Bookoff McAndrews, PLLC

(57) ABSTRACT

A paving system includes a paving machine and a controller. The paving machine includes a drive assembly, a paving material delivery system, including a hopper, a conveyor assembly, an auger, and a screed assembly, and at least one material sensor configured to monitor a delivery of paving material from the hopper to the auger by the conveyor assembly. The controller is coupled to the at least one material sensor and the conveyor assembly to control the delivery of paving material from the hopper to a ground surface.

17 Claims, 4 Drawing Sheets

(56) References Cited

U.S. PATENT DOCUMENTS

2017/0030027 A1   2/2017   Frelich et al.

FOREIGN PATENT DOCUMENTS

| DE | 102012209495 B4 | 12/2012 |
| DE | 102014014384 A1 | 4/2016 |
| JP | 5-49815 U | 7/1993 |
| JP | 2009-074252 A | 4/2009 |

\* cited by examiner

CONTROL SYSTEM FOR A PAVING MACHINE

TECHNICAL FIELD

The present disclosure relates generally to a road construction machine, and more particularly, to a control system for a paving machine.

BACKGROUND

The present disclosure relates to paving machines that are used in road surface construction and repairs. Paving machines are typically utilized to lay asphalt or other paving material. Paving often involves a material feed system installed on the paving machine. The material feed system may feed paving material from a hopper to a screed. The material feed system may include one or more conveyor assemblies and one or more augers that are located adjacent to the screed such that the one or more conveyor assemblies and augers can deliver paving material to be spread by the screed to form a mat of paving material. The amount of paving material and the rate at which the paving material is delivered to the screed affects the thickness of the mat of paving material. Additionally, the amount of paving material and the rate at which the paving material is delivered to the screed may affect the cost and/or quality of the paving operation.

U.S. Pat. No. 10,227,738 (hereinafter referred to as "the '738 patent") discloses a road paver that includes a layer thickness detecting device coupled to the screed. The layer thickness detecting device of the '738 patent includes a first sensor for detecting a first distance from the applied material layer and a second sensor for detecting a second distance from the foundation below the applied material layer. With the information from the first and second sensors, the paver of the '738 patent can determine a thickness of the layer of paving material that has been spread by the screed. However, the '738 patent does not determine an amount of paving material being delivered to the screed or a rate at which the paving material is being delivered. The paving machine of the present disclosure may solve one or more of the problems set forth above and/or other problems in the art. The scope of the current disclosure, however, is defined by the attached claims, and not by the ability to solve any specific problem.

SUMMARY

In one aspect, a paving system may include a paving machine and a controller. The paving machine may include a drive assembly, a paving material delivery system, including a hopper, a conveyor assembly, an auger, and a screed assembly, and at least one material sensor configured to monitor a delivery of paving material from the hopper to the auger by the conveyor assembly. The controller may be coupled to the at least one material sensor and the conveyor assembly to control the delivery of paving material from the hopper to a ground surface.

In another aspect, a paving material delivery system may include a hopper, a conveyor assembly, an auger, and at least one material sensor positioned above the conveyor assembly configured to monitor a delivery of paving material from the hopper to the auger.

In a further aspect, a method for delivering paving material may include initiating a paving operation with a paving machine, and monitoring a delivery of paving material, wherein the monitoring the delivery of paving material includes determining a delivery rate with a material sensor positioned above a conveyor assembly that connects a hopper to an auger or a screed assembly. The method may further include comparing the determined delivery rate of the paving material to a desired delivery rate of paving material, and if the determined delivery rate does not match the desired delivery rate, adjusting one or more parameters of the paving operation.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, system, or apparatus that comprises a list of elements does not include only those elements, but may include other elements not expressly listed or inherent to such a process, method, article, system, or apparatus.

For the purpose of this disclosure, the term "ground surface" is broadly used to refer to all types of surfaces that form typical roadways (e.g., asphalt, cement, clay, sand, dirt, etc.) or upon which paving material may be deposited in the formation of roadways. In this disclosure, relative terms, such as, for example, "about," "substantially," and "approximately" are used to indicate a possible variation of ±10% in a stated value. Although the current disclosure is described with reference to a paving machine, this is only exemplary. In general, the current disclosure can be applied as to any machine, such as, for example, a paver finisher, asphalt finisher, or another paving-type machine.

Figure 1:
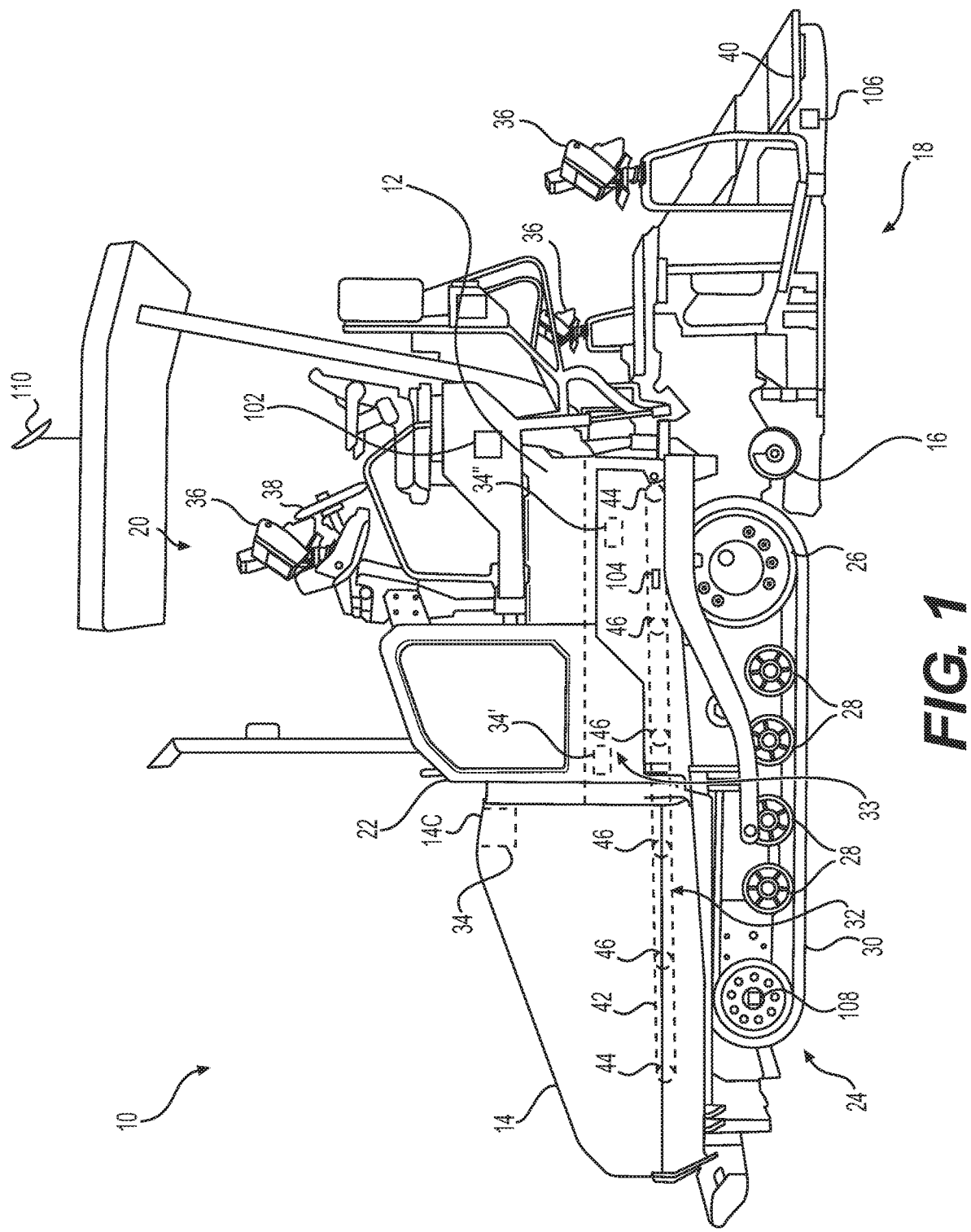
FIG. 1 is an illustration of an exemplary machine, according to aspects of this disclosure.

FIG. 1 illustrates a side view of an exemplary paving machine 10, according to the present disclosure. Machine 10 may be any size paver with any paving width. In one aspect, machine 10 may be a small paver, for example, with a maximum paving width of approximately 5.5 meters. Alternatively, in another aspect, machine 10 may be a large paver, for example, with a maximum paving width of approximately 11 meters. Machine 10 includes a frame 12, a hopper 14, an auger 16, and a screed 18. Machine 10 may also include an operator station 20, from which an operator may maneuver and control machine 10. Machine 10 may be propelled by an engine assembly 22 to power a drive assembly 24, including a drive wheel 26, one or more idlers 28, and tracks 30. Machine 10 includes a conveyor assembly 32 to transport paving material through a tunnel 33 from hopper 14 to auger 16 and screed 18. Machine 10 also includes a material sensor 34 to detect and/or measure an amount of paving material being carried by conveyor assembly 32. Additionally, machine 10 may include one or more control panels 36, for example, positioned in operator station 20 next to steering wheel 38, in one or more operator positions 40 on screed 18, remote from machine 10, etc. Control panels 36 may control and/or display information regarding one or more aspects of machine 10 via a controller 102.

Figure 2:
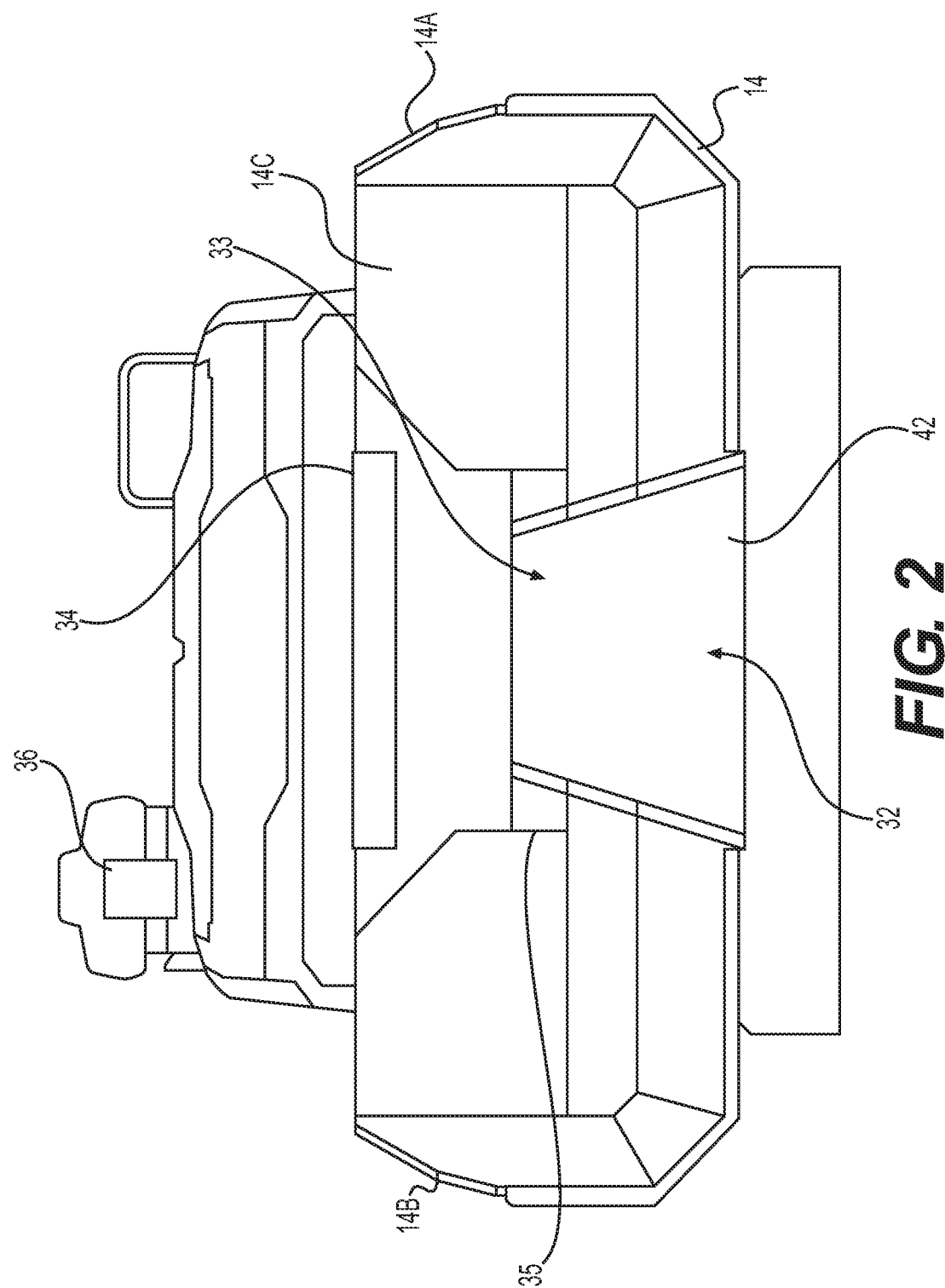
FIG. 2 is a front view of a portion of the exemplary machine of FIG. 1, according to aspects of this disclosure.

Hopper 14 may be positioned in a forward portion of frame 12 to receive or store the paving material, for example, from a mixer truck. As shown in FIG. 2, hopper 14 may include side portions 14A and 14B, which may be controllable to be lifted upward to help direct paving material within hopper 14 toward conveyor assembly 32. Hopper 14 also includes a rear portion 14C, which may help separate hopper 14 from the engine assembly 22 and other components of machine 10. Moreover, as also shown in FIG. 2, hopper 14 may include a window 35 formed by an opening in rear portion 14C in order for conveyor assembly 32 to extend and carry paving material into tunnel 33. Window 35 may also limit and/or restrict a height and/or a width of paving material being conveyed by conveyor assembly 32 in tunnel 33. For example, window 35 includes a height and a width. The width of window 35 may correspond to the width of conveyor assembly 32, or may be wider than the width of conveyor assembly 32, as shown in FIG. 2. The height of window 35 may limit a height of paving material conveyed on conveyor assembly 32 from hopper 14.

As mentioned, conveyor assembly 32 connects hopper 14 to auger 16 in a rear portion of machine 10 to convey the paving material. Conveyor assembly 32 may extend beneath engine assembly 22 and operator station 20, and may be positioned above drive assembly 24. Conveyor assembly 32 may include at least one conveyor belt 42 driven by at least one conveyor pulley 44. In one example, conveyor assembly 32 may include two conveyor pulleys 44, for example, one in a forward position and one in a rear position. For example, conveyor pulleys 44 may each rotate in order to drive conveyor belt 42 to deliver paving material from hopper 14 to auger 16. In another example, conveyor assembly 32 may include two conveyor belts 42, with each conveyor belt 42 being driven independently by a respective conveyor pulley 44. In one aspect, conveyor belt(s) 42 may travel over one or more plates or supports 46, which may help support conveyor belt(s) 42. Moreover, as shown in FIG. 2, conveyor assembly 32 may extend from a central position of hopper 14.

Although not shown, as mentioned above, conveyor assembly 32 may include two or more conveyor belts 42. The conveyor belts 42 may extend parallel to one another from hopper 14 to respective sides of auger 16 or two respective augers 16. The conveyor belts 42 may be separately controlled and/or driven, or may controlled together or otherwise linked. The speed of the conveyor belt(s) 42 may be determined based on, for example, a desired delivery rate of paving material to auger 16 and screed 18.

Auger 16 may be positioned perpendicular to the direction of travel of machine 10. Additionally, auger 16 may include a plurality of parallel or longitudinally arranged auger sections. Auger 16 may rotate at adjustable rotational speeds, and the rotational speed of auger or the auger sections may be correlated to the speed of conveyor assembly 32. Screed 18 is positioned to the rear of auger 16, and smooths the paving material delivered by auger 16 to the paving surface. The height of screed 18 may be adjustable, for example, via control panel 36. Operator station 20 may include a plurality of controls in order for an operator to steer machine 10, control a rate of delivery of the paving material (e.g., by adjusting a speed of conveyor assembly 32 by adjusting a rotation speed of conveyor pulley(s) 44), adjust the height of screed 18, etc.

As shown in FIG. 1, sensor 34 may be positioned above the junction of conveyor assembly 32 with hopper 14. As shown in FIG. 2, sensor 34 may be positioned in a central position of hopper 14. For example, sensor 34 may be positioned at rear end 14C of hopper 14 above window 35 and/or just forward of where paving material is conveyed from hopper 14 into tunnel 33. Sensor 34 may be a laser sensor configured to measure a height and/or a cross-sectional area of paving material being carried by conveyor assembly 32. For example, sensor 34 may emit laser energy downward toward conveyor assembly 32. A portion of the emitted laser energy may be reflected by the paving material on conveyor assembly 32 and may be received by sensor 34. Sensor 34 and/or controller 102 may analyze the received energy to determine a distance between sensor 34 and the paving material in order to determine a height of the paving material relative to the conveyor assembly 32 at a position below sensor 34. Sensor 34 and/or controller 102 may also analyze the received energy to determine a width of the paving material on the conveyor assembly 32 at the position below senor 34. The height of the paving material may change over a width of conveyor assembly 32. Nevertheless, sensor 34 may measure and/or be programmed with the width of conveyor belt(s) 42, and may then determine a cross-sectional area of the paving material across the width of conveyor assembly 32 below sensor 34. Sensor 34 may transmit information regarding the height and/or the cross-sectional area of paving material to controller 102. With the instantaneous height and/or cross-sectional area of paving material and the speed of conveyor belt 42, controller 102 may determine a flow rate of paving material on conveyor belt 42, and thus a delivery rate of paving material by conveyor assembly 32.

In another aspect, sensor 34 may be a sonic sensor, an optical sensor, or another appropriate sensor to determine the height and/or the cross-sectional area of paving material on conveyor assembly 32. As discussed above, in these aspects, sensor 34 may emit energy toward conveyor assembly 32 and receive reflected energy to determine a distance between sensor 34 and the paving material, and thus determine a height of the paving material being transported by conveyor assembly 32. Moreover, sensor 34 may be able to also emit energy toward hopper 14 and receive reflected energy indicative of one or more heights of paving material within hopper 14, and thus an amount of paving material within hopper 14. For example, such measurements may be used to help ensure a consistent flow of paving material from hopper 14, and/or to provide information regarding the amount of paving material within hopper 14 (e.g., that a mixer truck is required to add paving material to hopper 14). Alternatively, in another aspect, sensor 34 may be a mechanical level sensor positioned above a portion of conveyor assembly 32. In any of the aforementioned aspects, if machine 10 includes two or more conveyor belts 42, machine 10 may include two or more sensors 34, with each sensor 34 being positioned above the respective conveyor belt 42.

As shown in FIG. 1, one or more sensors may be positioned in other positions relative to conveyor assembly 32. Sensor 34' may be positioned within tunnel 33 toward the middle of conveyor assembly 32, for example, below engine assembly 22. Alternatively, sensor 34" may be positioned toward the rear of conveyor assembly 32, for example, below operator station 20. Furthermore, sensor 34''' may be positioned at a rearmost position of conveyor assembly 32 where conveyor belt 42 delivers the paving material to auger 16. In any of these aspects, sensors 34, 34', and 34" may help determine a delivery rate of paving material by conveyor assembly 32. Moreover, machine 10 may include any arrangement of one or more sensors 34, 34', and 34", and controller 102 may receive information from each of the one or more sensors 34, 34', and 34" to determine a height, and thus a cross-section, of the paving material on conveyor assembly 32. For example, controller 102 may receive information from sensor 34 and from sensor 34" to determine whether the cross-sectional area of the paving material changes over a portion of conveyor assembly 32.

Figure 3:
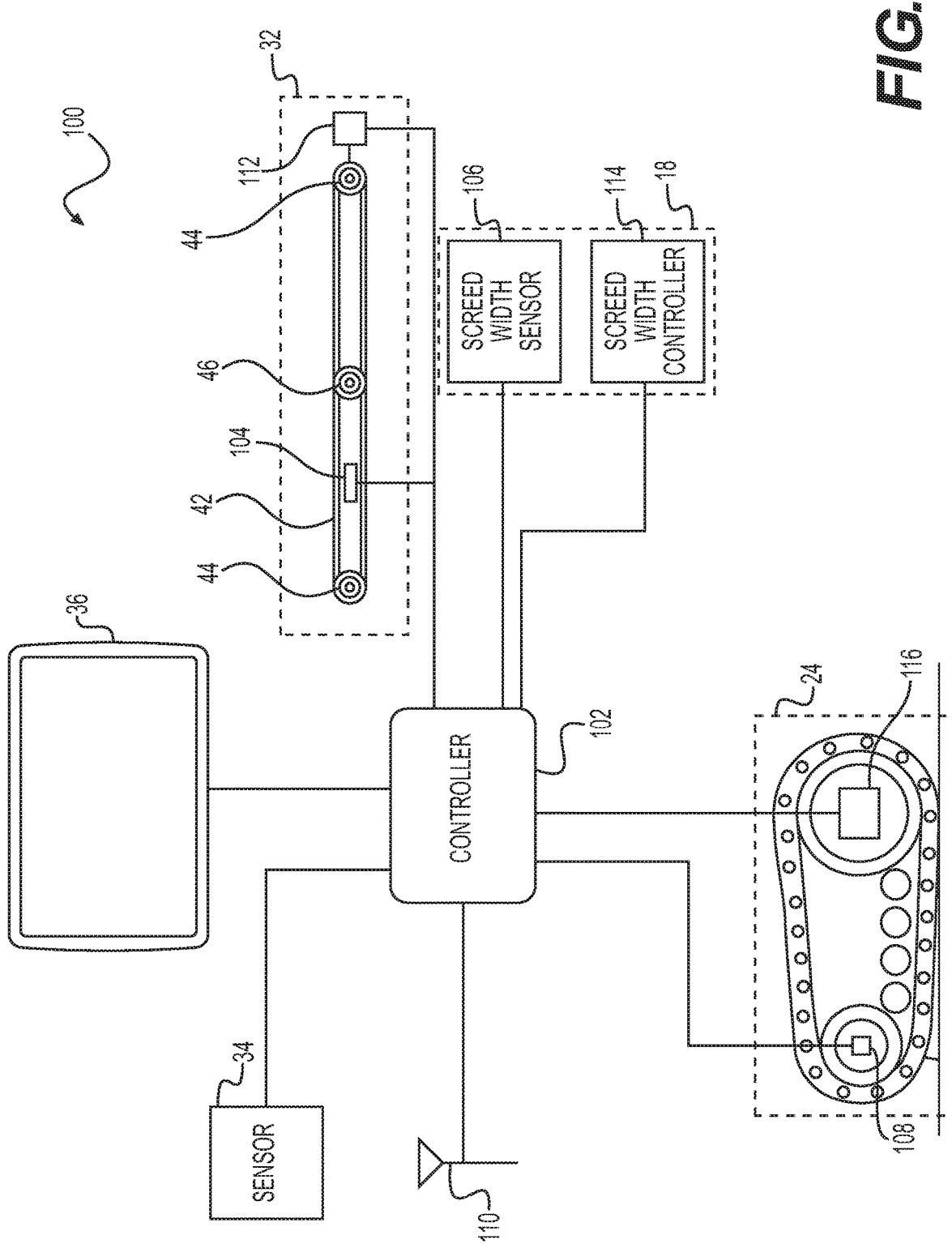
FIG. 3 is a schematic view of a portion of a control system for the exemplary machine of FIG. 1, according to aspects of this disclosure.

Referring to FIGS. 1 and 3, one or more control panels 36 may include or be coupled to (e.g., wired or wirelessly) controller 102. As shown in FIG. 3, controller 102 may also be coupled to sensor 34, and may also be coupled to one or more sensors and/or to one or more actuators on machine 10 to form a control system 100. For example, machine 10 may include a conveyor speed sensor 104, a screed width sensor 106, and a track speed sensor 108. Machine 10 may also include one or more positioning sensors 110 (e.g., a global positioning system antenna, a LIDAR sensor, a stringline sensor, a total station unit to be detected or otherwise sensed by a universal total station monitor positioned on the worksite, etc.). Machine 10 may also include a conveyor speed controller 112, a screed width controller 114, a track speed controller 116. Additionally, machine 10 may include one or more additional actuators or controllers to control the movement of machine 10 and its components, such as, for example, a steering direction sensor and/or a steering direction controller. Each of the sensors, controllers, and/or actuators may be in communication (e.g., a wired connection or a wireless connection) with each other, for example, through controller 102. Moreover, in one aspect, one or more of conveyor speed controller 112, screed width controller 114, track speed controller 116, and any other controllers of machine 10 may be part of controller 102.

Control panel 36 may be operable to control the delivery of paving material by controlling at least one of a conveyor speed, screed width, and/or track speed, for example, via controller 102. In one aspect, control panel 36 may include a touch screen user interface and/or other displays or input devices.

Conveyor speed sensor 104 may be coupled to and/or monitor a portion of conveyor assembly 32. In one aspect, conveyor speed sensor 104 may be a rotational speed sensor coupled to or built in with one or more a motor (e.g., a hydraulic motor) that drives one or more conveyor pulleys 44. Alternatively or additionally, conveyor speed sensor 104 may be coupled to and/or monitor conveyor belt 42 or one or more conveyor pulleys 44. Furthermore, in another aspect, conveyor speed sensor 104 may be configured to determined the speed at which paving material is moving on conveyor belt 42. Conveyor speed controller 112 may be coupled to one or more conveyor pulleys 44, for example, to control the rotational rate of one or more conveyor pulleys 44. In one aspect, conveyor speed controller 112 may include a motor coupled to and driving the rotation of one or more conveyor pulleys 44 in order to rotate the one or more conveyor pulleys 44 and thus control the movement of conveyor belt 42.

Screed width sensor 106 may be coupled to and/or monitor a portion of screed 18 and may help determine a width of screed 18. In one aspect, although not shown, screed 18 may include a left screed portion and a right screed portion, which may each be extendable and retractable to control a width of screed 18. Screed width sensor 106 may be coupled to the left and right screed portions in order to determine an extension or retraction of each of the left and right screed portions to determine an overall width of screed 18. Screed width controller 114 may also be coupled to screed 18, for example, to the left and right screed portions. Screed width controller 114 may include one or more drive assemblies or actuators (e.g., hydraulic cylinders) configured to adjust the width of screed 18, for example, by controlling the lateral extension or retraction of one or more of the left and right screed portions.

Track speed sensor 108 may be coupled to and/or monitor one or more portions of drive assembly 24 and may help determine a ground speed of machine 10. In one aspect, track speed sensor 108 may be coupled to and/or monitor one or more of drive wheel 26, idlers 28, and/or tracks 30. Track speed controller 116 may also be coupled to a portion of drive assembly 24, for example, to drive wheel 26. Track speed controller 116 may be coupled to and control a motor coupled to and driving the rotation of drive wheel 26 in order to rotate drive wheel 26 and thus control the movement of track 30.

Conveyor speed sensor 104 and conveyor speed controller 112 are coupled to controller 102 in order to determine and control a speed of conveyor belt 42. Screed width sensor 106 and speed width controller 114 are coupled to controller 102 in order to determine and control a width of screed 18. Track speed sensor 108 and track speed controller 116 are coupled to controller 102 in order to determine and control a speed of track 30, and thus help determine and control a ground speed of machine 10.

As mentioned above, machine 10 may include position sensor 110. Position sensor 110 may help to determine a position of machine 10 on a worksite and/or relative to other machines and/or topographical features. Position sensor 110 may also help to determine an overall ground speed for machine 10.

Although not shown, controller 102 may be in communication with additional sensors mounted to or within machine 10, for example, an odometer, a speedometer, temperature sensors, etc. Moreover, controller 102 may be in communication with additional displays or operator stations, for example, a central control station for the worksite, an electronic log or memory that stores operating instructions and/or records the positions and other operational aspects of machine 10 over a worksite, etc.

Figure 4:
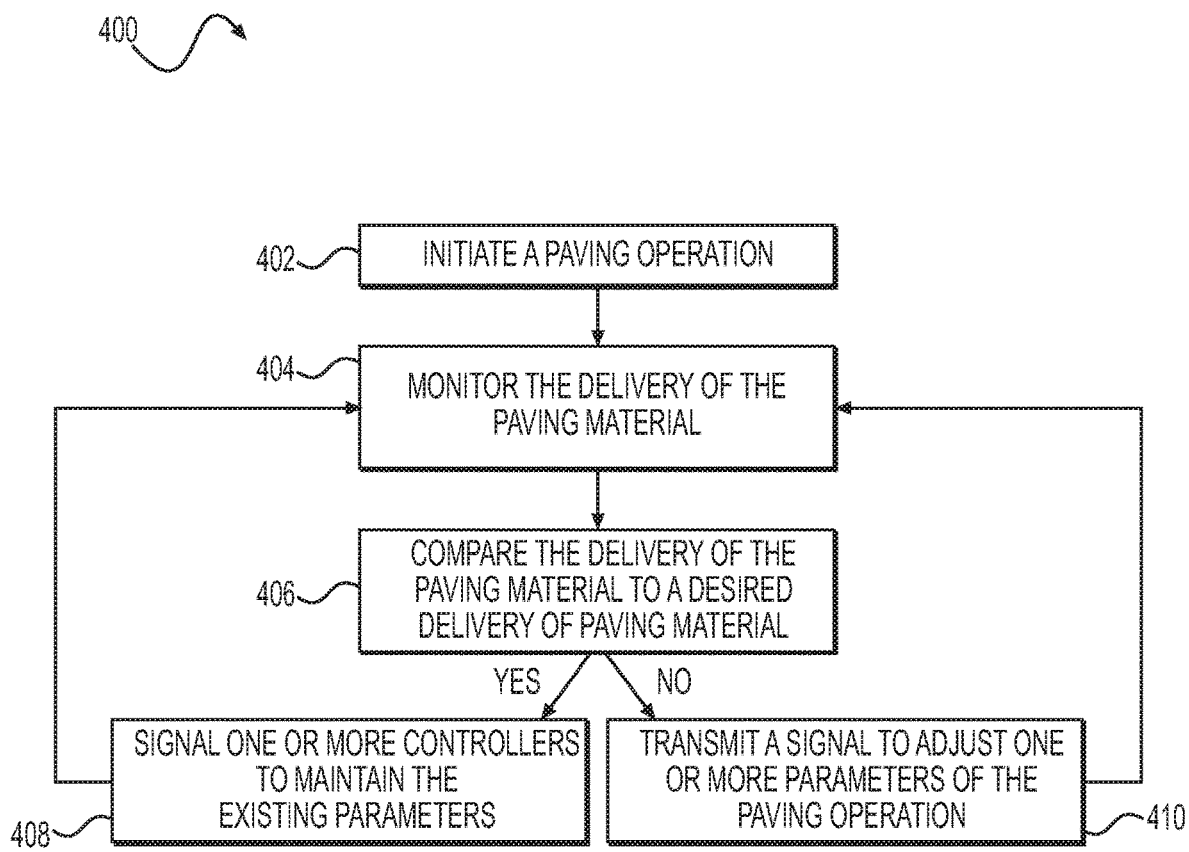
FIG. 4 provides a flow chart depicting an exemplary method for controlling the delivery of paving material for a machine, according to aspects of this disclosure.

FIG. 4 is a flow diagram portraying an exemplary paving method 400 that may be performed by control system 100 to monitor and/or control the delivery of paving material by machine 10. Method 400 includes a step 402, in which machine 10 may initiate a paving operation. Step 402 may include controller 102 signaling one or more of conveyor speed controller 112, screed width controller 114, and/or track speed controller 116. For example, controller 112 may signal conveyor speed controller 112 to activate conveyor pulley 44 to move conveyor belt 42. Furthermore, controller 112 may signal screed width controller 114 to set a width of screed 18, and controller 112 may signal track speed controller 116 to power drive wheel 26 to move track 30.

Method 400 includes a step 404, where controller 102 monitors the delivery of paving material, for example, via sensor 34. Controller 102 may also be in communication with one or more of conveyor speed sensor 104, screed width sensor 106, track speed sensor 108, and/or position sensor 110. Controller 102 may determine a rate of delivery of paving material to the ground surface. For example, based on the height and/or the cross-sectional area of paving material as measured by sensor 34 and the speed of conveyor belt 42, controller 102 may determine a rate at which the paving material is being delivered from hopper 14 to auger 16. In one aspect, controller 102 may determined a volume of material being delivered by multiplying the cross-section of the material on conveyor belt 42 (from sensor 34) by the speed of the conveyor belt 42. For example:

Material Volume=(Material Cross-Section)×(Speed of Conveyor Belt)

Based on the speed of tracks 30 (and thus the speed of machine 10), controller 102 may also determine a rate at which the paving material is being delivered to the ground surface. Furthermore, based on the width of screed 18, controller 102 may determine a thickness of the paving material that has been delivered to the ground surface and spread by screed 18. For example, controller 102 may determine a paving thickness by dividing the determined material volume by the product of the paving width (from screed width sensor 106) and the paving distance (from track speed sensor 108 and/or position sensor 110). For example:

Paving Thickness=(Material Volume)/((Paving Width)×(Paving Distance))

Method 400 also includes a step 406, in which controller 102 compares the determined rate of delivery of paving material to a desired rate of delivery of paving material to determine whether the determined rate of delivery matches (or is within an acceptable range relative to) the desired rate of delivery. The desired rate of delivery of paving material may be a user-input rate of delivery (e.g., cubic meters of paving material per minute, cubic meters of paving material per paved meter, etc.). Alternatively, the desired rate of delivery may be a pre-programmed rate of delivery specific to machine 10, a type of paving operation, etc.

If the determined rate of delivery of paving material matches the desired rate of delivery of paving material, controller 102 may signal one or more of conveyor speed controller 112, screed width controller 114, and/or track speed controller 116 to maintain the existing parameters in a step 408. Method 400 may then return to step 404.

If, however, the determined rate of delivery of paving material does not match the desired rate of delivered of paving material, method 400 may include a step 410, in which controller 102 transmits a signal to adjust one or more parameters of the paving operation. For example, step 410 may include controller 102 transmitting a signal to one or more of conveyor speed controller 112, screed width controller 114, and/or track speed controller 116 to adjust the existing parameters before returning to step 404.

It is noted that the desired rate of delivery of paving material may be input and/or monitored in a variety of ways. For example, the desired rate of delivery of paving material may be measured as a volume of paving material being conveyed by conveyor belt 42, and thus delivered to auger 16, as a function of time. Alternatively, the desired rate of delivery of paving material may be measured in a volume of paving material being spread by screed 18 as a function of paving area. Moreover, an operator may desire to know how many tons of paving material are currently being delivered or have been delivered per hour by machine 10. In another aspect, an operator may desire to know how many tons of paving material are currently being delivered or have been delivered per mile of paving. If the measured rate differs from the desired rate, controller 102 may signal one or more adjustments. For example, if the amount of paving material being conveyed by conveyor belt 42 is below the desired amount, controller 102 may signal conveyor speed controller 112 to accelerate conveyor pulley 44 to drive conveyor belt 42 at a faster speed. Similarly, an acceleration of conveyor belt 42 may also result in auger 16 rotating at a faster rate. Alternatively or additionally, controller 102 may signal track speed controller 116 to decelerate drive wheel 26 to drive track 30 (and thus machine 10) at a lower speed.

Moreover, in one aspect, step 410 may include alerting the operator to the determined rate of delivery of paving material and/or whether the determined rate of delivery of paving material matches the desired rate of delivery of paving material. For example, the determined rate of delivery and the desired rate of delivery may both be displayed on a screen of control panel 36. Alternatively or additionally, if the determined rate of delivery and the desired rate of delivery do not match, an alert or alarm may be displayed on the screen of control panel 36, audibly sounded, or otherwise activated to alert the operator to the difference between the determined rate of delivery and the desired rate of delivery, and thus the need to adjust one or more parameters for machine 10. The one or more parameters may be adjusted automatically or may be manually adjusted by the operator (e.g., via control panel 36).

The above steps of method 400 may be periodically performed during a paving operation (e.g., every 10 minutes, every 30 minutes, every hour, every 50 meters, every 100 meters, every 200 meters etc.), or may be constantly performed during the paving operation. Moreover, the results of step 406 may be displayed on control panel 36, another display, a user interface, etc.

Industrial Applicability

The disclosed aspects of machine 10 may be used in any paving machine to assist in delivery of paving material. During operation, conveyor assembly 32 may deliver paving material to the ground surface traversed by machine 10, for example, from hopper 14 to auger 16 and screed 18. Sensor 34 may help to monitor the delivery of the paving material to the ground surface, which may help to ensure that the proper amount of paving material is being delivered and spread on the ground surface. As mentioned, sensor 34 may be a laser, sonic, optical, or mechanical sensor that may measure a height of a pile of paving material on conveyor assembly 32. Sensor 34 may determine a width of the paving material. Alternatively or additionally, a width of conveyor belt 42 may be known. In one aspect, when hopper 14 is completely full (e.g., with paving material filling hopper 14 and abutting rear end 14C, sensor 34 positioned above window 35 may be able to measure a height of the paving material in hopper 14, but may not be able to measure a height of the paving material on conveyor belt 42. In such an instance, controller 102 may use the known height of window 35 to approximate the height of the paving material on conveyor belt 42. Nevertheless, sensor 34' and/or sensor 34", with their positions within tunnel 33, may determine a height of the paving material on conveyor belt 42 within tunnel 33. With the height and width of the paving material, along with the speed of conveyor belt 42, controller 102 may determine an instantaneous flow rate of paving material being conveyed by conveyor assembly 32.

With the speed of machine 10 via track speed sensor 108 and/or position sensor 110, controller 102 may determine a rate at which the paving material is being delivered to the ground surface. Moreover, with the width of screed 18 via screed width sensor 106, controller 102 may determine a rate at which the paving material is being spread on the ground surface. Controller 102 may then compare one or more of the flow rate on conveyor assembly 32, the delivery rate to the ground surface, and/or the spread rate on the ground surface to respective desired rates. Accordingly, if necessary, controller 102 may signal one or more of conveyor speed controller 112, screed width controller 114, and track speed controller 116 to adjust the respective parameters (e.g., speed up or slow down conveyor belt 42, extend or retract screed 18, or speed up or slow down track 30). Controller 102 may signal the operator (e.g., via control panel 36) to make the appropriate adjustments, or controller 102 may automatically signal one or more of the controllers to make the appropriate adjustments.

With the aforementioned monitoring steps and measuring a duration of the paving operation, the systems and methods discussed herein may track the amount of paving material being delivered during the paving operation. For example, controller 102 may track and/or display (e.g., on control panel 36) a volume of paving material that is currently being delivered (e.g., instantaneously), a volume of paving material that has been delivered over a period of time (e.g., the last hour), and/or a volume of paving material that has been delivered over the entirety of the paving operation. Such information may be helpful to analyze the effectiveness, efficiency, cost, quality, and/or other parameters of the paving operation.

Moreover, in one aspect, a paving operation may begin with a known amount of paving material in hopper 14. Then, based on height of paving material removed from hopper 14 by conveyor assembly 32, the speed of conveyor belt 42, and the elapsed duration of the paving operation, controller 102 may signal to the operator (e.g., via control panel 36), that the amount of paving material in hopper 14 is running low. Controller 102 may signal that a mixer truck is required to add paving material to hopper 14.

The disclosed aspects of machine 10 also allow a user to monitor and adjust the various elements of machine 10, including those elements that deliver paving material, from either a position on machine 10 or from a remote position. For example, a user may monitor and adjust the conveyor speed, the screed width, and/or the machine speed via control panel 36. If, for example, machine 10 begins to pave at a lower speed, then the user may decrease the speed of conveyor belt 42, increase the width of screed 18, etc. to help avoid delivering too much paving material to the ground surface. In an additional aspect, a user may pre-program a correlation between the speed of tracks 30, width of screed 18, and the speed of conveyor belt 42 to be implemented by controller 102 in order to help ensure the delivery of an appropriate amount of paving material to the ground surface.

It will be apparent to those skilled in the art that various modifications and variations can be made to the disclosed machine without departing from the scope of the disclosure. Other embodiments of the machine will be apparent to those skilled in the art from consideration of the specification and practice of the control system for a paving machine disclosed herein. It is intended that the specification and examples be considered as exemplary only, with a true scope of the disclosure being indicated by the following claims and their equivalents.

What is claimed is:

1. A paving system, comprising:
    a paving machine, including:
        a drive assembly;
        a paving material delivery system, including a hopper, a conveyor assembly, an auger, and a screed assembly; and
        at least one material sensor configured to monitor a delivery of paving material from the hopper to the auger by the conveyor assembly;
        a conveyor speed sensor configured to monitor a speed of a conveyor belt of the conveyor assembly, wherein a rotational speed of the auger is adjustable and correlated to the speed of the conveyor belt of the conveyor assembly; and
    a controller, wherein the controller is coupled to the at least one material sensor, the conveyor speed sensor, and the conveyor assembly to control the delivery of paving material from the hopper to a ground surface, wherein the controller is configured to control the speed of the conveyor belt based on a determined rate of delivery of the paving material from the hopper to the auger by the conveyor assembly, and wherein the controller is configured to control a width of the screed assembly based on the determined rate of delivery of the paving material from the hopper to the auger by the conveyor assembly.

2. The paving system of claim 1, wherein the at least one material sensor is positioned above the conveyor assembly in a rear portion of the hopper.

3. The paving system of claim 2, wherein the at least one material sensor is configured to determine a height of the paving material being conveyed on the conveyor assembly.

4. The paving system of claim 3, wherein the at least one material sensor is a laser sensor configured to emit laser energy and analyze a received amount of laser energy that has been reflected by the paving material.

5. The paving system of claim 3, wherein either the at least one material sensor or the controller is configured to determine a cross-sectional area of the paving material being conveyed on the conveyor assembly.

6. The paving system of claim 1, wherein the controller is coupled to at least a portion of the drive assembly to monitor and/or control movement of the paving machine over the ground surface based on a measured delivery rate of the paving material from the hopper to the auger by the conveyor assembly.

7. The paving system of claim 6, wherein the controller is coupled to the screed assembly to monitor and/or control a width of the screed assembly based on the measured delivery rate of the paving material from the hopper to the auger by the conveyor assembly.

8. The paving system of claim 1, wherein the controller is coupled to a screed width sensor and a track speed sensor, and
    wherein the controller is configured to receive information from the conveyor speed sensor, the screed width sensor, and the track speed sensor to determine the determined rate of delivery of paving material from the hopper to the ground surface,
    wherein the controller is configured to compare the determined rate of delivery of paving material to a user-input or preprogrammed rate of delivery of paving material, and
    wherein the controller is configured to adjust one or more of a conveyor speed, a screed width, and a track speed in order to adjust the rate of delivery of paving material to match the user-input or preprogrammed rate of delivery of paving material.

9. A paving material delivery system, comprising:
    a hopper;
    a conveyor assembly;
    an auger; and
    a material sensor positioned above the conveyor assembly configured to monitor a delivery of paving material from the hopper to the auger, wherein the material sensor is positioned above the conveyor assembly in a rear portion of the hopper.

10. The paving material delivery system of claim 9, further comprising a controller, wherein the controller is coupled to the material sensor and the conveyor assembly to control the delivery of paving material from the hopper to the auger by controlling one or more parameters of the paving material delivery system, including adjusting a speed of the conveyor assembly and adjusting a width of a screed assembly.

11. The paving material delivery system of claim 10, wherein the material sensor is configured to determine a height of the paving material being conveyed on the conveyor assembly.

12. The paving material delivery system of claim 11, wherein the material sensor is a laser sensor configured to emit laser energy and analyze a received amount of laser energy that has been reflected by the paving material.

13. The paving material delivery system of claim 12, further comprising a conveyor speed sensor and a conveyor speed controller,
wherein the controller is configured to receive information from the conveyor speed sensor and the material sensor to determine a rate of delivery of paving material from the hopper to a ground surface,
wherein the controller is configured to compare the determined rate of delivery of paving material to a user-input or preprogrammed rate of delivery of paving material, and
wherein the controller is configured to signal the conveyor speed controller to adjust a conveyor speed in order to adjust the rate of delivery of paving material to match the user-input or preprogrammed rate of delivery of paving material.

14. The paving material delivery system of claim 10, further comprising a screed assembly configured to spread the paving material, wherein the screed assembly includes a screed width sensor.

15. The paving material delivery system of claim 14, wherein the controller is coupled to the screed width sensor, and
wherein the controller is configured to receive information from the screed width sensor and the material sensor to determine a rate of delivery of paving material from the hopper to a ground surface,
wherein the controller is configured to compare the determined rate of delivery of paving material to a user-input or preprogrammed rate of delivery of paving material, and
wherein the controller is configured to adjust a screed width in order to adjust the rate of delivery of paving material to match the user-input or preprogrammed rate of delivery of paving material.

16. A method for delivering paving material, comprising:
initiating a paving operation with a paving machine;
monitoring a delivery of paving material, wherein the monitoring the delivery of paving material includes determining a delivery rate with a material sensor positioned above a conveyor assembly that connects a hopper to an auger or a screed assembly, wherein the material sensor is positioned above the conveyor assembly in a position at a rear of the hopper, and wherein determining the delivery rate further includes monitoring a speed of the conveyor assembly, monitoring a width of the screed assembly, and monitoring a speed of the paving machine;
comparing the determined delivery rate of the paving material to a desired delivery rate of paving material; and
if the determined delivery rate does not match the desired delivery rate, adjusting one or more parameters of the paving operation, and wherein the one or more parameters of the paving operation include adjusting the speed of the conveyor assembly, adjusting the width of the screed assembly, and adjusting the speed of the paving machine.

17. The method of claim 16, wherein the monitoring includes the material sensor emitting energy toward the conveyor assembly and analyzing reflected energy to determine a height of the paving material on the conveyor assembly in the position at the rear of the hopper.

* * * * *